(12) United States Patent
The et al.

(10) Patent No.: US 12,528,624 B2
(45) Date of Patent: Jan. 20, 2026

(54) UTILITY BOX COVER

(71) Applicant: Southwire Company, LLC, Carrollton, GA (US)

(72) Inventors: Agus Suryana The, Mesa, AZ (US); Jason Peter Thomas, Mesa, AZ (US)

(73) Assignee: Southwire Company, LLC

( * ) Notice: Subject to any disclaimer, the term of this patent is extended or adjusted under 35 U.S.C. 154(b) by 103 days.

(21) Appl. No.: 18/454,915

(22) Filed: Aug. 24, 2023

(65) Prior Publication Data

US 2024/0067413 A1 Feb. 29, 2024

Related U.S. Application Data

(60) Provisional application No. 63/373,340, filed on Aug. 24, 2022.

(51) Int. Cl.
*B65D 43/16* (2006.01)
*B65D 55/14* (2006.01)

(52) U.S. Cl.
CPC .......... *B65D 43/164* (2013.01); *B65D 55/14* (2013.01); *B65D 2543/00194* (2013.01); *B65D 2543/00351* (2013.01)

(58) Field of Classification Search
CPC .. B65D 5/0085; B65D 5/009; B65D 33/1675; B65D 43/16; B65D 45/16; B65D 43/164; B65D 55/14; B65D 2543/00194; B65D 2543/00351; H02G 3/081; H02G 3/14
See application file for complete search history.

(56) References Cited

U.S. PATENT DOCUMENTS

| 1,713,495 | A | * | 5/1929 | Weindel, Jr. | ............. | B65D 7/06 217/3 BC |
| 5,285,918 | A | * | 2/1994 | Weisburn | ............... | B65D 55/06 206/387.1 |
| 2008/0264946 | A1 | * | 10/2008 | Moschella | ............... | B25H 3/02 292/277 |
| 2022/0306337 | A1 | * | 9/2022 | Layton | ..................... | B65D 7/26 |

* cited by examiner

*Primary Examiner* — Kareen K Thomas
(74) *Attorney, Agent, or Firm* — Merchant & Gould P.C.

(57) ABSTRACT

A utility box be provided. The utility box may comprise a base and a lid. The base may comprise a keeper that may comprise a keeper opening. The lid may be hingedly attached to the base. The lid may comprise a tang comprising a tang opening wherein the lid may be operative to hingedly close on the base. When the lid is closed on the base, the keeper may be operative to retain the tang and the keeper opening and the tang opening may align.

19 Claims, 5 Drawing Sheets

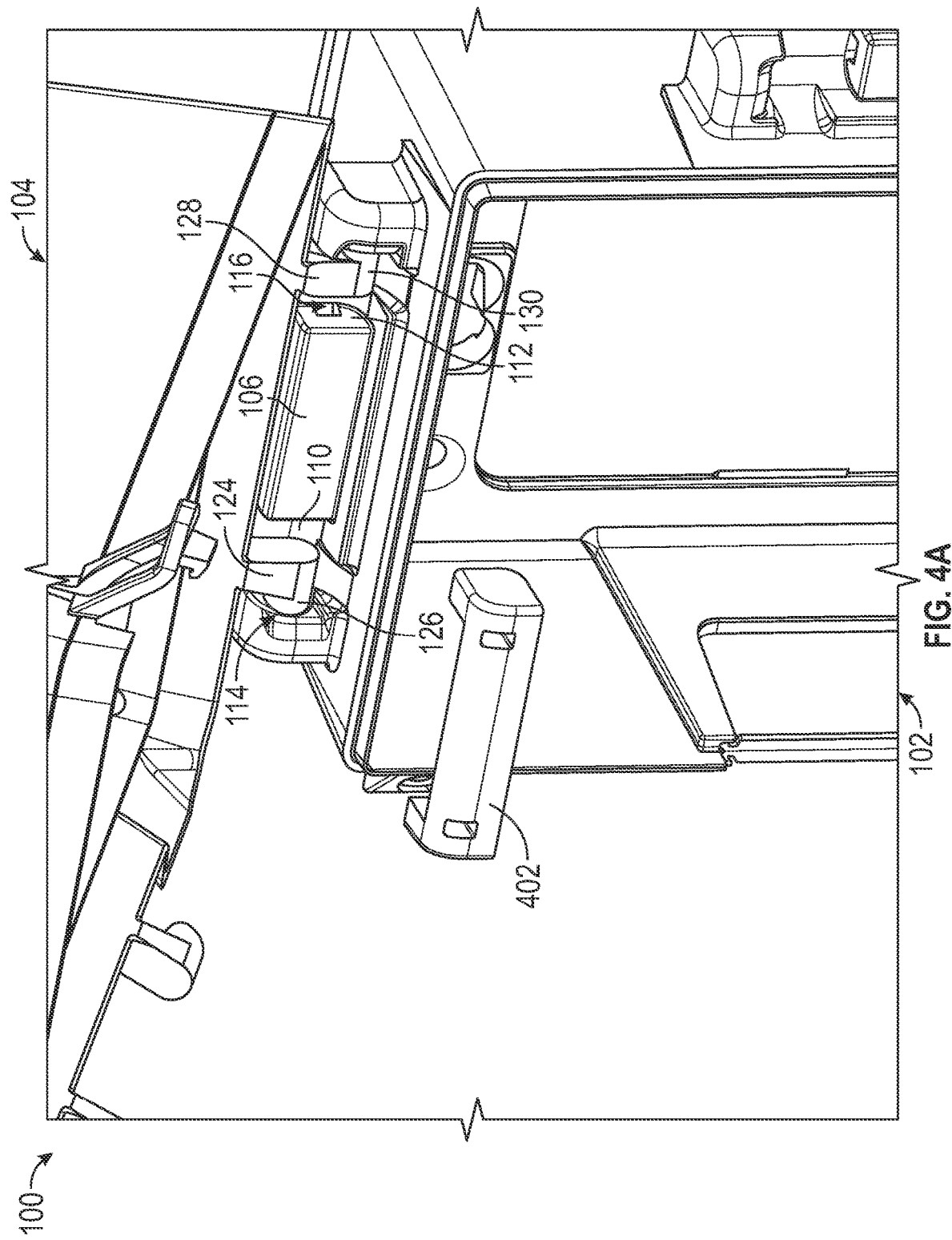

UTILITY BOX COVER

RELATED APPLICATION

Under provisions of 35 U.S.C. § 119(e), Applicant claims the benefit of U.S. Provisional Application No. 62/373,340, filed Aug. 24, 2022, which is incorporated herein by reference in its entirety.

BACKGROUND

A utility box (e.g., an electrical wall switch box, an electrical wall outlet box, an electrical ceiling box, a switch box, an outlet box, an electrical box, etc.) is the container for the space behind electrical fittings such as power outlet sockets, light switches, or fixed light fixtures. Utility boxes may be designed for either surface mounting (e.g., with cabling running along the wall surface) or for embedding in the wall or skirting board. The term "flush box" is used for a mounting box that goes inside the wall, although some use the term "wall box". Boxes for installation within timber/plasterboard walls are usually called "cavity boxes" or "plasterboard boxes". A ceiling-mounted utility box is referred to as a "ceiling box".

Utility boxes contain devices for input (e.g., switches) and output (e.g., sockets and fixtures), with transfer managed by junction boxes. Utility boxes may be made of metal or plastic. A utility box is made to standard dimensions and may contain embedded bushings (e.g., in standard positions) for the attachment of wiring devices (e.g., switches and sockets). Utility boxes may not include the corresponding faceplates, because the devices to be contained in the box specify the required faceplate.

BRIEF DESCRIPTION OF THE FIGURES

The accompanying drawings, which are incorporated in and constitute a part of this disclosure, illustrate various embodiments of the present disclosure. In the drawings:

FIGS. 4A and 4B show a utility box cover.

DETAILED DESCRIPTION

Overview

Figure 1:
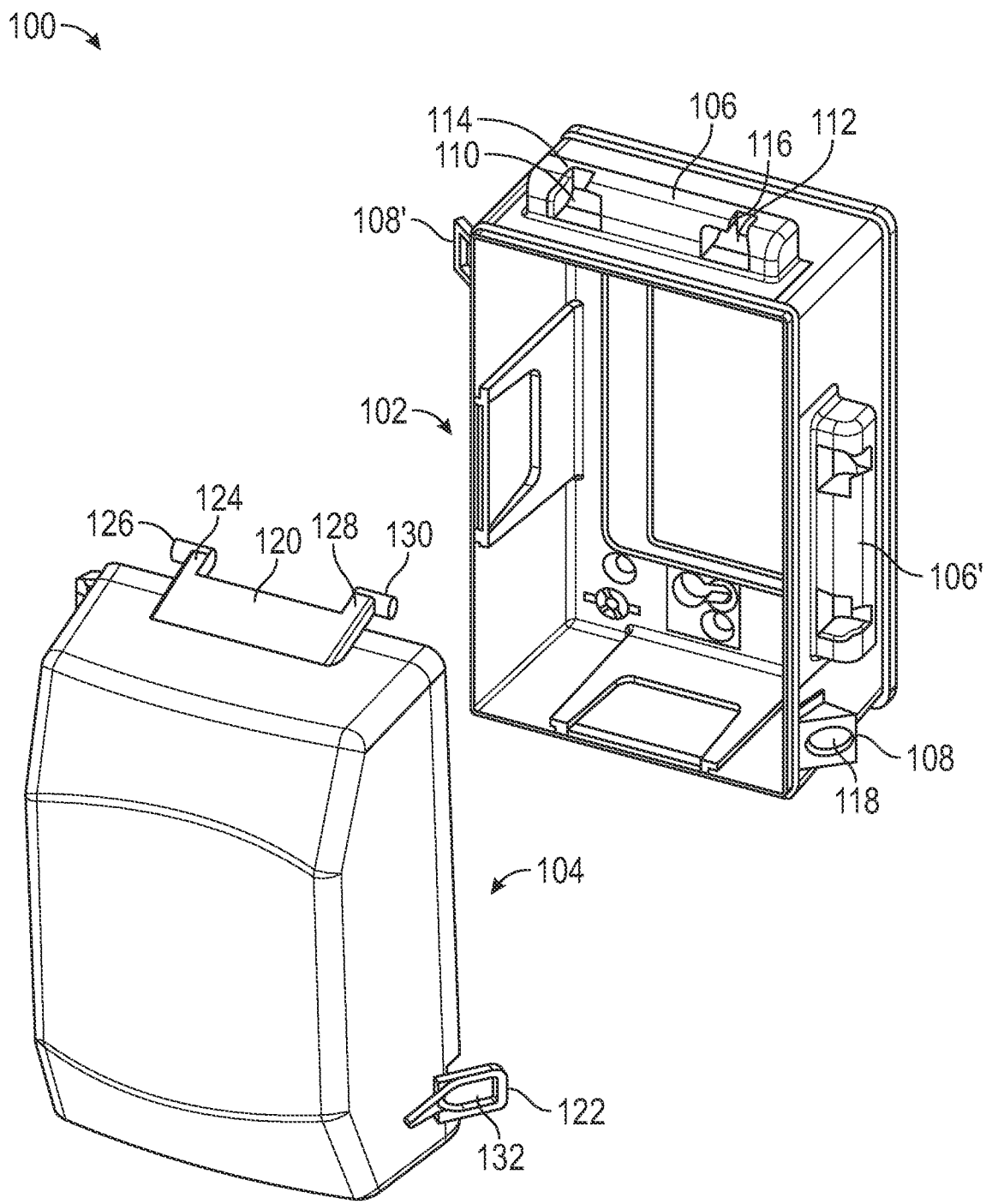
FIG. 1 shows a utility box cover.

A utility box cover be provided. The utility box cover may comprise a base and a lid. The base may comprise a keeper that may comprise a keeper opening. The lid may be hingedly attached to the base. The lid may comprise a tang comprising a tang opening wherein the lid may be operative to hingedly close on the base. When the lid is closed on the base, the keeper may be operative to retain the tang and the keeper opening and the tang opening may align.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Electrical wiring is an electrical installation of cabling and associated devices such as switches, distribution boards, sockets, and light fittings in a structure. Wiring is subject to safety standards for design and installation. Allowable wire and cable types and sizes may be specified according to the circuit operating voltage and electric current capability, with further restrictions on the environmental conditions, such as ambient temperature range, moisture levels, and exposure to sunlight and chemicals.

Associated circuit protection, control, and distribution devices within a building's wiring system may be subject to voltage, current, and functional specifications. Wiring safety codes vary by locality, country, or region. The International Electrotechnical Commission (IEC) is attempting to harmonize wiring standards among member countries, but significant variations in design and installation requirements may still exist. Wiring installation codes and regulations may be intended to protect people and property from electrical shock and fire hazards. They may be based on a model code produced by a national or international standards organization.

Building wire and cable are used in the construction of almost every commercial, industrial, and residential property. Most commonly known as branch circuit wiring in homes and businesses, these products carry electrical current to all power applications in a building or dwelling.

Utility boxes may be used to mount electrical hardware (i.e., wiring devices) comprising, but not limited to, electrical outlets and switches fed by the aforementioned building wire and cables. In some situations, the utility boxes may be mounted outdoors. When mounted outdoors, the utility boxes may be made weather resistant by providing the unity box with a weather resistant utility box cover. For example, the weather resistant utility box cover may allow an electrical cord's plug to plug into an outlet mounted in the utility box while keeping the utility box weather resistant when the utility box cover is closed and the electrical cord is plugged into the outlet.

FIG. 1 shows a utility box cover 100. As shown in FIG. 1, utility box cover 100 may comprise a base 102 and a lid 104. Base 102 may comprise a receiver 106 and a keeper 108. Receiver 106 may comprise a first receiver opening 110, a second receiver opening 112, a first slot 114, and a second slot 116. Keeper 108 may comprise a keeper opening 118.

Lid 104 may comprise a pin 120 and a tang 122. Pin 120 may comprise a first arm 124 comprising a first ear 126. Pin 120 may further comprise a second arm 128 comprising a second ear 130. Tang 122 may comprise a tang opening 132.

Consistent with embodiments of the disclosure, lid 104 may hingedly attach to base 102 via a hinge comprising receiver 106 and pin 120. Lid 104 may be operative to hingedly close on the base 102. When lid 104 is closed on base 102, keeper 108 may be operative to retain tang 122 and keeper opening 118 and tang opening 132 may align. After lid 104 is closed on base 102 and keeper 108 is retaining lid 104 on base 102, keeper 108 may be operative to release tang 122 when tang 122 is flexed away from keeper 108. For example, an operator may place a finger under an end of tang 122 to apply a force sufficient enough to flex tang 122 causing it to release from keeper 108 and allowing lid 104 to rotate to an opened position.

When lid 104 is in a closed position on base 102 and keeper opening 118 and tang opening 132 are aligned, keeper opening 118 and tang opening 132 may be operative to receive a locking device. For example, a hasp of a padlock may be placed in both keeper opening 118 and tang opening 132 when they are aligned and the padlock may be placed in a locked position.

Figure 2:
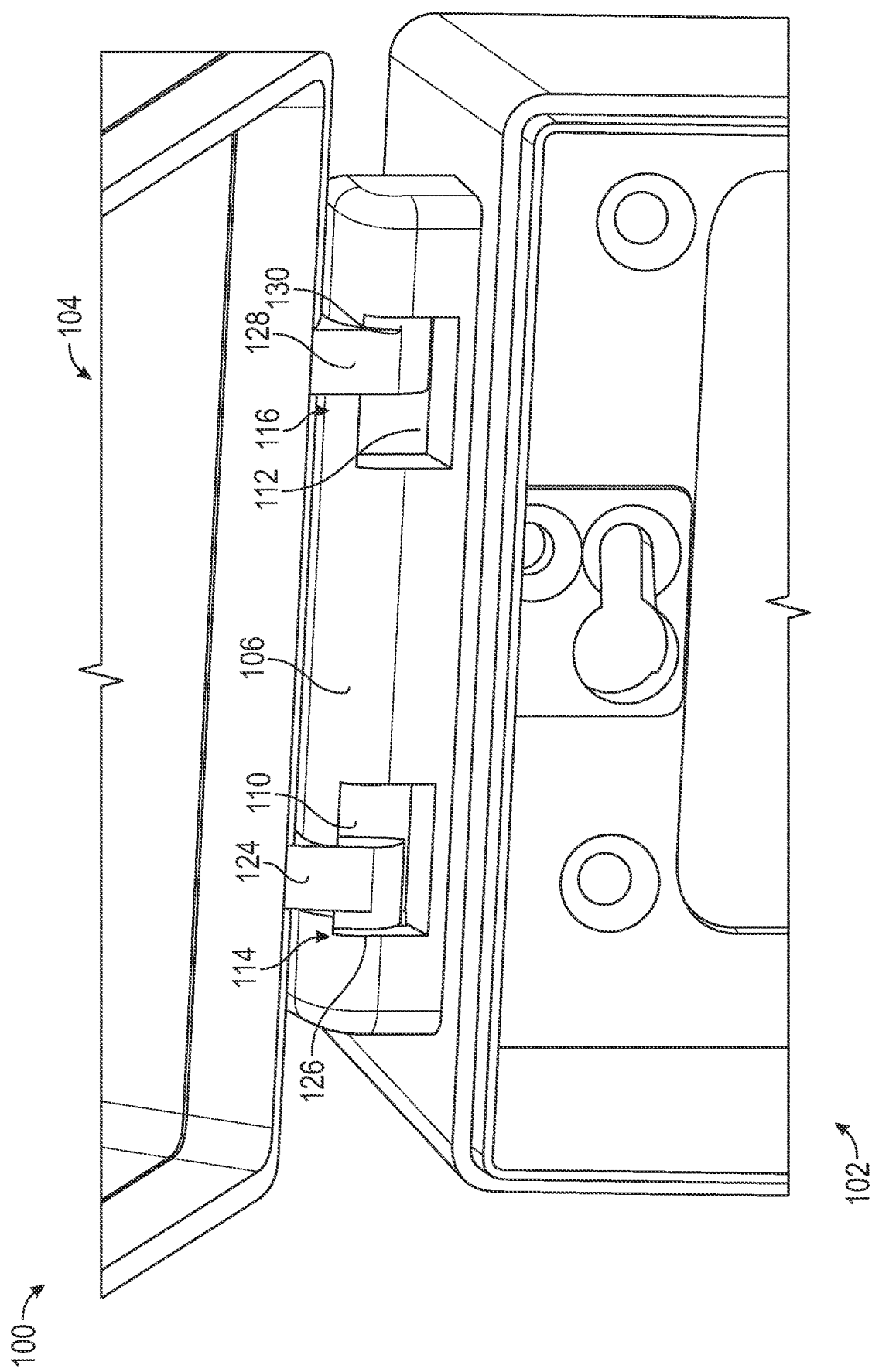
FIG. 2 shows a utility box cover.

Consistent with embodiments of the disclosure, lid 104 may hingedly attach to base 102 via a hinge comprising receiver 106 and pin 120. FIG. 1 shows utility box cover 100 where base 102 and lid 104 are detached and FIG. 2 shows utility box cover 100 where base 102 and lid 104 are attached. Consistent with embodiments of the disclosure, in order to go from the detached configuration of FIG. 1 to the attached configuration of FIG. 2, first arm 124 and second arm 128 may be operative to flex when first ear 126 and second ear 130 are snapped into receiver 106. For example, both first ear 126 and second ear 130 may comprise a chamfer (i.e., a chamfered edge). When first ear 126 and second ear 130 are snapped into receiver 106, their respective chamfers may engage respective outer edges of first receiver opening 110 and second receiver opening 112 respectively. When a force is applied to lid 104 when the aforementioned outer edges are engages, the force may cause first arm 124 and second arm 128 to flex when first ear 126 and second ear 130 are snapped into receiver 106. Once lid 104 is attached to base 102 and in a fully opened position as shown in FIG. 2, first slot 114 may be operative to support first arm 124 and second slot 116 may be operative to support second arm 128.

Figure 3:
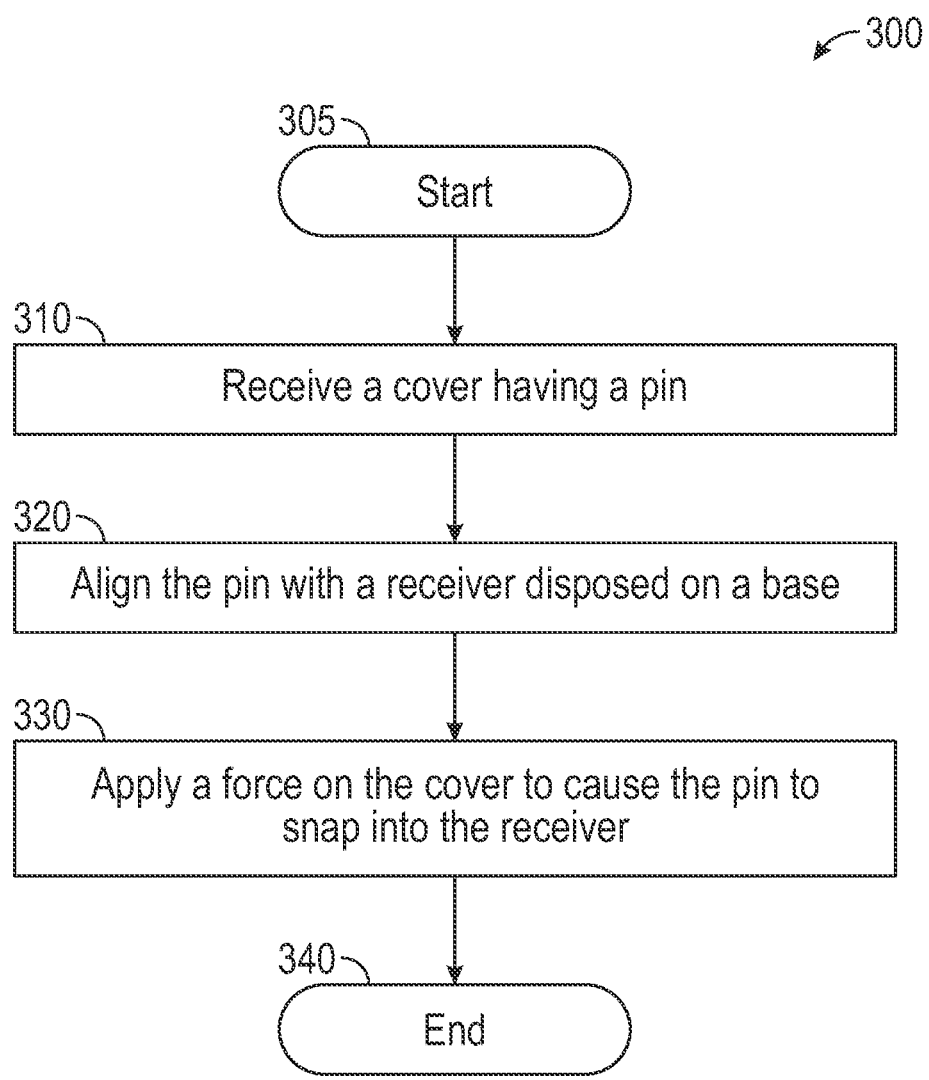
FIG. 3 shows a method for providing a utility box cover.

FIG. 3 is a flow chart setting forth the general stages involved in a method 300 consistent with an embodiment of the disclosure for providing a utility box cover. Method 300 may be implemented by an operator using utility box cover 100 as described in more detail above with respect to FIG. 1 and FIG. 2 and below with respect to FIGS. 4A and 4B. Ways to implement the stages of method 300 will be described in greater detail below.

Method 300 may begin at starting block 305 and proceed to stage 310 where an operator may receive lid 104 having pin 120. For example, the operator may be in the process of installing utility box cover 100 onto a utility box containing a wiring device comprising, but not limited to, an electrical outlet or a switch fed by building wire and cables. First, base 102 may be mounted to the utility box. In some situations, utility box cover 100 may be mounted outdoors. When mounted outdoors, utility box cover 100 may be made weather resistant by providing utility box cover 100 with a weather resistant lid (e.g., lid 104).

From stage 310, where the operator receives lid 104 having pin 120, method 300 may advance to stage 320 where the operator may align pin 120 with receiver 106 disposed on base 102. Consistent with embodiments of the disclosure, lid 104 may hingedly attach to base 102 via the hinge comprising receiver 106 and pin 120. FIG. 1 shows utility box cover 100 where base 102 and lid 104 are detached and FIG. 2 shows utility box cover 100 where base 102 and lid 104 are attached. Consistent with embodiments of the disclosure, in order to go from the detached configuration of FIG. 1 to the attached configuration of FIG. 2, the operator may align pin 120 with receiver 106 disposed on base 102.

Once the operator aligns pin 120 with receiver 106 disposed on base 102 in stage 320, method 300 may continue to stage 330 where the operator may apply a force on lid 104 to cause pin 120 to snap into receiver 106. For example, first arm 124 and second arm 128 may be operative to flex when first ear 126 and second ear 130 are snapped into receiver 106. Both first ear 126 and second ear 130 may comprise a chamfer (i.e., a chamfered edge). When first ear 126 and second ear 130 are snapped into receiver 106, their respective chamfers may engage respective outer edges of first receiver opening 110 and second receiver opening 112 respectively. The outer edges of first receiver opening 110 and second receiver opening 112 may also comprise chamfers that may be associated with and complement the chamfers of first ear 126 and second ear 130. When the operator applies the force to lid 104 when the aforementioned outer edges are engages, the force may cause first arm 124 and second arm 128 to flex when first ear 126 and second ear 130 are snapped into receiver 106. Once lid 104 is attached to base 102 and the operator rotates lid 104 to the fully opened position as shown in FIG. 2, first slot 114 may be operative to support first arm 124 and second slot 116 may be operative to support second arm 128.

When the operator closes lid 104 on base 102, keeper 108 may be operative to retain tang 122 and keeper opening 118 and tang opening 132 may align. After lid 104 is closed on base 102 and keeper 108 is retaining lid 104 on base 102, keeper 108 may be operative to release tang 122 when tang 122 is flexed away from keeper 108. For example, the operator may place a finger under an end of tang 122 to apply a force sufficient enough to flex tang 122 causing it to release from keeper 108 and allowing lid 104 to rotate to an opened position.

When the operator places lid 104 in the closed position on base 102 and keeper opening 118 and tang opening 132 are aligned, keeper opening 118 and tang opening 132 may be operative to receive a locking device. For example, the operator may place a hasp of a padlock in both keeper opening 118 and tang opening 132 when they are aligned and the operator may place the padlock in a locked position. Once the operator applies the force on lid 104 to cause pin 120 to snap into receiver 106 in stage 330, method 300 may then end at stage 340.

Figure 4B:
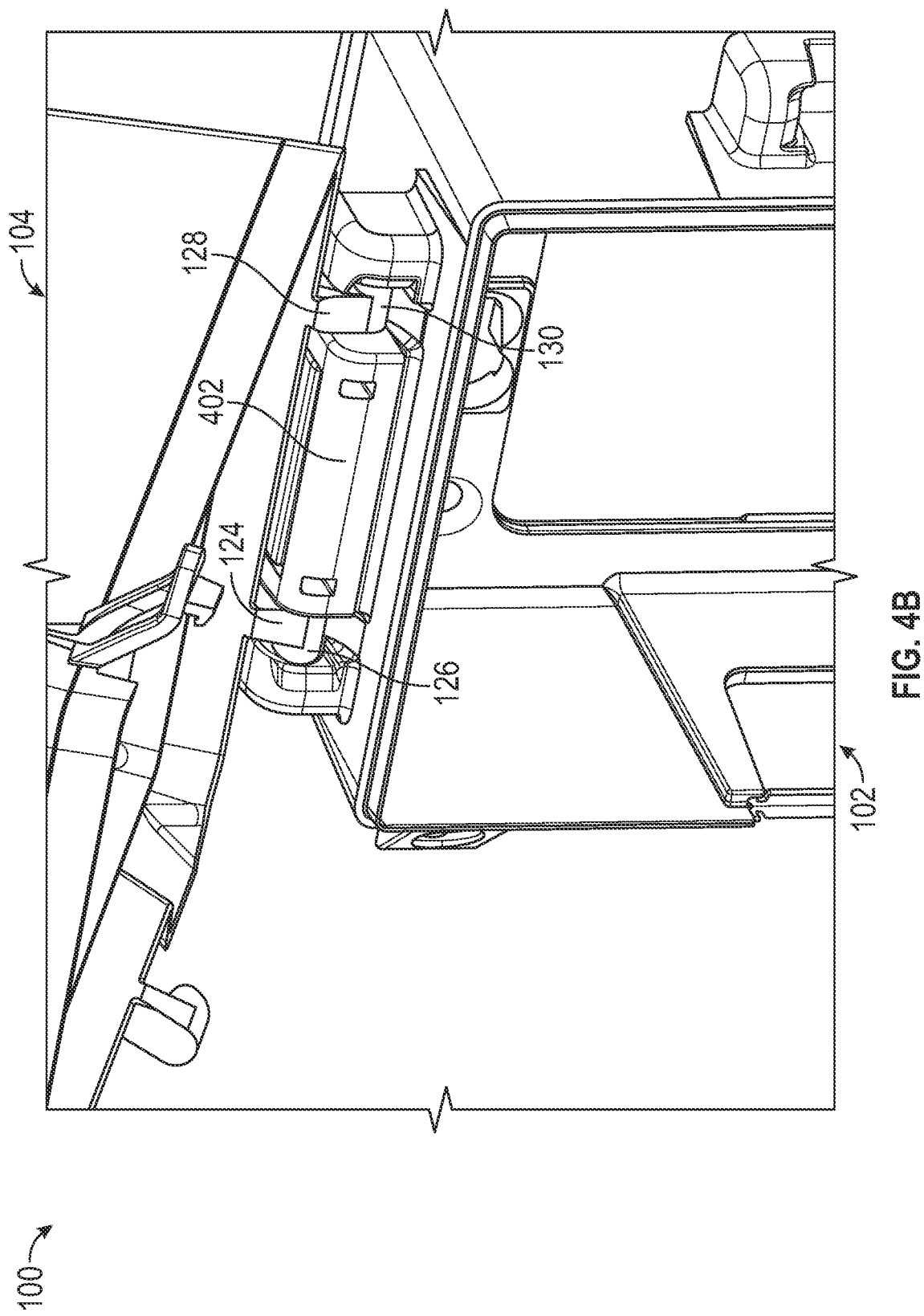

FIGS. 4A and 4B show other embodiments of utility box cover 100. The embodiments shown in FIGS. 4A and 4B may be similar to those shown in FIG. 1 and FIG. 2, however, the embodiments shown in FIGS. 4A and 4B may include a hinge retainer 402. For example, receiver 106 may be configured to accept hinge retainer 402.

Consistent with embodiments of the disclosure, in order for lid 104 to go from the detached configuration to the attached configuration, first arm 124 and second arm 128 may be operative to flex when first ear 126 and second ear 130 are snapped into receiver 106. For example, both first ear 126 and second ear 130 may comprise a chamfer (i.e., a chamfered edge). When first ear 126 and second ear 130 are snapped into receiver 106, their respective chamfers may engage respective outer edges of first receiver opening 110 and second receiver opening 112 respectively. The outer edges of first receiver opening 110 and second receiver opening 112 may also comprise chamfers that may be associated with and complement the chamfers of first ear 126 and second ear 130. When the operator applies the force to lid 104 when the aforementioned outer edges are engages, the force may cause first arm 124 and second arm 128 to flex when first ear 126 and second ear 130 are snapped into receiver 106.

Once lid 104 is attached to base 102, hinge retainer 402 may be snapped into place. Hinge retainer 402 may be held in with snap features that may be oriented so that they may not disengaged during normal operation of cover 100. First receiver opening 110 and second receiver opening 112 may be filled by hinge retainer 402.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a base comprising a keeper wherein the keeper comprises a keeper opening; and
   a lid hingedly attached to the base wherein the lid comprises a tang wherein the tang comprises a tang opening wherein the lid is operative to hingedly close on the base, wherein, when the lid is closed on the base, the keeper is operative to retain the tang and the keeper opening and the tang opening align;
   a hinge that hingedly attaches the lid to the base, wherein the hinge comprises:
      a first arm disposed on the lid, wherein the first arm comprises a first ear; and
      a second arm disposed on the lid, wherein the second arm comprises a second ear; and
   a receiver disposed on the base wherein the receiver comprises:
      a first receiver opening associated with the first ear, and
      a second receiver opening associated with the second ear.

2. The apparatus of claim 1, wherein the keeper is operative to release the tang when the tang is flexed away from the keeper.

3. The apparatus of claim 1, wherein the keeper opening and the tang opening are operative to receive a locking device when the lid is closed on the base.

4. The apparatus of claim 3, wherein the locking device comprises a padlock.

5. The apparatus of claim 1, wherein the apparatus is attached to a utility box.

6. The apparatus of claim 1, wherein the first arm and the second arm are operative to flex when the first ear and the second ear are snapped into the receiver.

7. The apparatus of claim 6, wherein the hinge further comprises:
   a first chamfer associated with the first ear; and
   a second chamfer associated with the second ear.

8. The apparatus of claim 7, wherein the receiver further comprises:
   a first slot operative to support the first arm when the lid is opened; and
   a second slot operative to support the second arm when the lid is opened.

9. An apparatus comprising:
   a base;
   a lid; and
   a hinge that hingedly attaches the lid to the base wherein the hinge comprises;
      a first arm disposed on the lid, wherein the first arm comprises a first ear,
      a second arm disposed on the lid, wherein the second arm comprises a second ear, and
      a receiver disposed on the base wherein the receiver comprises,
         a first receiver opening associated with the first ear, and
         a second receiver opening associated with the second ear wherein the first arm and the second arm are operative to flex when the first ear and the second ear are snapped into the receiver.

10. The apparatus of claim 9, wherein the hinge further comprises:
    a first chamfer associated with the first ear; and
    a second chamfer associated with the second ear.

11. The apparatus of claim 10, wherein the receive further comprises:
    a first slot operative to support the first arm when the lid is opened; and
    a second slot operative to support the second arm when the lid is opened.

12. The apparatus of claim 9, wherein:
    the base comprises a keeper wherein the keeper comprises a keeper opening; and
    the lid comprises a tang wherein the tang comprises a tang opening, wherein, when the lid is closed on the base, the keeper is operative to retain the tang, and the keeper opening and the tang opening align.

13. The apparatus of claim 12, wherein the keeper is operative to release the tang when the tang is flexed away from the keeper.

14. The apparatus of claim 12, wherein the keeper opening and the tang opening are operative to receive a locking device when the lid is closed on the base.

15. The apparatus of claim 14, wherein the base is attached to a utility box.

16. An apparatus comprising:
    a base comprising a keeper wherein the keeper comprises a keeper opening;
    a lid comprises a tang wherein the tang comprises a tang opening wherein the lid is operative to hingedly close on the base, wherein, when the lid is closed on the base, the keeper is operative to retain the tang and the keeper opening and the tang opening align; and
    a hinge that hingedly attaches the lid to the base wherein the hinge comprises;
       a first arm disposed on the lid, wherein the first arm comprises a first ear,
       a second arm disposed on the lid, wherein the second arm comprises a second ear, and
       a receiver disposed on the base wherein the receiver comprises,
          a first receiver opening associated with the first ear, and
          a second receiver opening associated with the second ear wherein the first arm and the second arm are operative to flex when the first ear and the second ear are snapped into the receiver.

17. The apparatus of claim 16, wherein the keeper is operative to release the tang when the tang is flexed away from the keeper.

18. The apparatus of claim 16, wherein the keeper opening and the tang opening are operative to receive a locking device when the lid is closed on the base.

19. The apparatus of claim 16, wherein the hinge further comprises:
   a first chamfer associated with the first ear;
   a second chamfer associated with the second ear; and
   wherein the receive further comprises;
   a first slot operative to support the first arm when the lid is opened, and
a second slot operative to support the second arm when the lid is opened.

\* \* \* \* \*